Aug. 26, 1958  W. C. DODD  2,848,836
BAIT HARNESS
Filed May 29, 1956
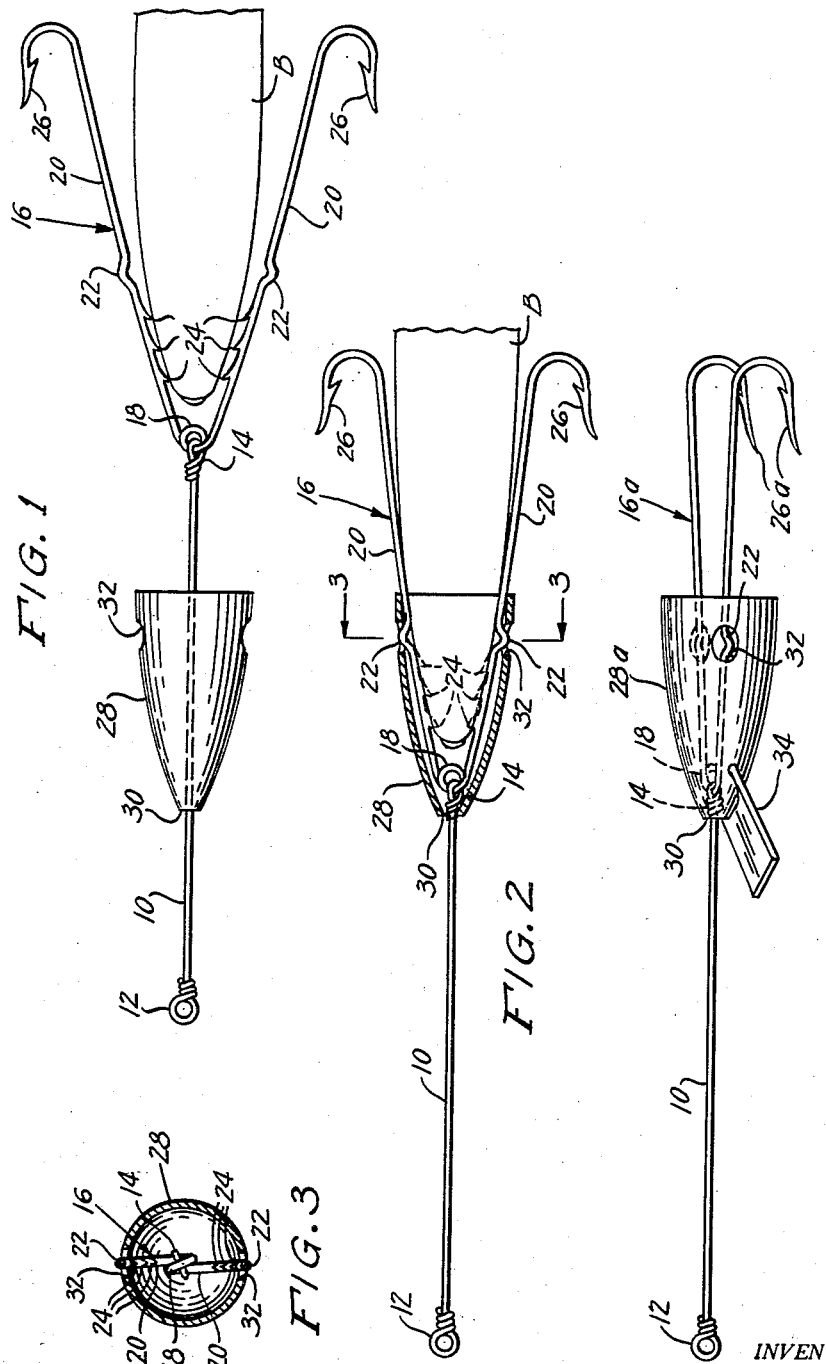
INVENTOR.
WILLIAM C. DODD
BY
McMorrow, Berman & Davidson
ATTORNEYS

United States Patent Office 2,848,836
Patented Aug. 26, 1958

2,848,836

BAIT HARNESS

William C. Dodd, Ontario, Calif.

Application May 29, 1956, Serial No. 588,145

2 Claims. (Cl. 43—44.6)

This invention relates to a bait harness for use in fishing, said harness being so designed as to securely engage a live bait, such as a minnow, in position such that when the bait is taken by a game fish, the fish will be hooked, upon hooks carried by the harness.

The main object of the present invention is to provide a generally improved bait harness, characterized by its simplicity, and by its ease of engagement with a bait. To this end, the invention, summarized briefly, comprises a leader which may be formed of thin wire or the like, said leader being connected to the apex portion of a substantially V-shaped harness element having rearwardly diverging arms terminating at their divergent ends in hooks, said arms being under spring tension tending to normally bias the same away from one another. Adjacent the convergent ends of the arms, there are provided confronting barbs or teeth, so that when the arms are pressed toward one another against opposite sides of a live bait such as a minnow, the teeth will bite into opposite sides of the minnow, to cause the same to be securely clamped between the arms of the highest element. Intermediate the ends of the respective arms, there are formed outwardly pressed lugs, and these are adapted to engage, when the arms are shifted inwardly of one another into clamping engagement with the bait, in diametrically opposed locking apertures formed in the side wall of a tapering hood member slidably mounted upon the leader. Thus, a bait can be positioned between the arms, after which the arms are shifted toward one another against the restraint of the spring action thereof, and thereafter, the hood member can be slid axially of the leader to receive the arms, with the lugs lockingly engaging in the apertures of the hood element to hold the arms in clamping relation to the bait.

One important object of the invention is to provide a bait harness as described that will be particularly adapted to facilitate connection of the bait to the harness, and will be adapted to effect disconnection of a bait for replacement thereof by a fresh bait, with equal speed and ease.

Another object of importance is to so design the harness as to cause it, despite its relative simplicity and low cost, to securely engage the bait.

Still another object is to so engage the bait within the harness as to damage the bait to a minimum extent, thereby to keep the bait alive and full of vitality, for a maximum period of time.

Yet another object is to provide an improved locking means for the harness, which can be swiftly adjusted to locking and unlocking positions relative to the clamping arms.

Yet another object of importance is to provide a device of the character described which will have hooks so disposed as to cause the same to be swiftly set in the fish's mouth, when the bait is taken by a game fish.

Other objects will appear from the following description, the claims appended thereto, and from the annexed drawing, in which like reference characters designate like parts throughout the several views, and wherein:

Figure 1 is a top plan view of a bait harness formed according to the present invention, as it appears during the step of engaging a live bait therein;

Figure 2 is a longitudinal sectional view through the harness in bait-clamping position;

Figure 3 is a transverse section on line 3—3 of Figure 2; and

Figure 4 is a view of the harness in bait-clamping position, the bait not being shown, illustrating a modified form.

Referring to the drawings in detail, the reference numeral 10 designates an elongated leader, which may be formed from a thin length of wire, although this is not essential to successful operation of the invention.

Leader 10 is formed at its forward end with a line-attaching eye 12, and at its rear end is formed with a connecting loop 14 loosely, pivotally connected to a harness element or clamp generally designated 16.

Clamp 16 is formed from a single length of relatively stiff but inherently springable wire, having medially between its opposite ends a spring loop 18 receiving connecting loop 14. Spring loop 18 merges into rearwardly diverging, straight, elongated clamping arms 20, formed intermediate their ends with outwardly pressed crimps providing locking lugs 22. Between the locking lugs 22 and the spring coil 18, there is formed on the inner surface of each clamping arm a longitudinal series of low, sharply tipped clamping teeth 24.

At their rearward, divergent ends, clamping arms 20 are formed with substantially coplanar, outwardly directed hook portions 26.

A hood member has been designated at 28, and is formed of transparent plastic in a preferred embodiment of the invention. Hood member 28 is tapered along curving lines in the direction of its leading end, and is formed at its smaller end with an opening 30 loosely receiving the leader 10. Adjacent its larger, rear end, the hood member has diametrically opposed locking apertures 32.

In use of the device, a live bait B such as a minnow, is positioned between the clamping arms with its head extended between the series of clamping teeth 24. The spring coil is inherently tensioned to bias the clamping arms outwardly to their Figure 1 positions, to facilitate insertion of the bait.

Then, the hood member is shifted axially to the right in Figure 1, upon the leader 10, and will move into the Figure 2 position. As the hood member nears its Figure 2, locking position, the end edge thereof, at the larger end of the hood member, exerts a cam action against the outwardly directed lugs 22 of the clamping arms, biasing the same inwardly, thus causing corresponding inward movement of the arms 20 toward each other against the restraint of the spring coil 18.

This causes the locking teeth 24 to be pressed into the opposite sides of the head of the bait B, as shown in Figure 2, and ultimately, when the hood member is in its final position, the lugs 22 will spring into the apertures 32, to interlockingly engage the hood member with the clamp 16, to hold the clamp arms in their inwardly biased position.

The device is now ready for use, and may be used in trolling, casting, or in any of various other types of fishing activities.

When the bait is to be replaced, one need merely manually press the clamp arms 20 inwardly to a slightly greater degree than is shown in Figure 2, to move the lugs 22 inwardly out of the apertures 32. As a result, the hood element 28 can be moved to the left in Figure 2, to disengage the clamp arms, thus freeing the bait for replacement.

In Figure 4 there is shown a sligthly modified form, wherein the hood elements 28a is similar in all respects to the hood element 28, with the exception that a forwardly declining scoop 34 is fixedly connected to the tapered, forward end portion of the hood element.

This facilitates use of the device in slow trolling or casting activities, the purpose of the scoop being to give more of a lively action to the lure or harness. In all other respects the hood element is identical to that shown in the first form. Furthermore, in the modified form there is shown a clamp designated 16a, which is similar in all respects to the clamp 16 except for the fact that the hook portions 26a are extended downwardly, rather than laterally outwardly, to be disposed at opposite sides of and in closely spaced relation to the bait. The clamp 16 could be used with the hood element 28a, or alternatively, the clamp 16a could be used with the hood element 28 of Figures 1 and 2, as desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A harness for a live bait fish comprising a single length of spring wire including medially between its opposite ends a spring loop, said length including elongated, transversely spaced clamping arms into one end of which the loop merges, said arms including outwardly bowed crimps intermediate their ends forming locking lugs, each of the arms being formed with a longitudinal series of sharply tipped clamping teeth extending between the crimp of the arm and said loop, the teeth of the respective arms being extended laterally inwardly from the arms in the space therebetween for engaging in opposite sides of the head of a bait fish, said loop being tensioned to normally shift the arms laterally outwardly from each other out of engagement with the bait fish, the arms at their other ends being formed with hook portions; a line connector attached to and projecting forwardly from said loop; and a hood member having a continuous, substantially uniform taper from end to end thereof closely duplicating the taper of a head of a bait fish for snug fitting of the head into the hood member, said member having at its smaller end an opening loosely receiving the line connector, and having adjacent its larger end apertures angularly spaced about the circumference of the hood member for receiving the lugs to releasably lock the member and arms against relative longitudinal movement, said member, when the lugs are engaged in the apertures, holding the arms in head-clamping positions against the restraint of the loop.

2. A harness for a live bait fish comprising a single length of spring wire including medially between its opposite ends a spring loop, said length including elongated, transversely spaced clamping arms into one end of which the loop merges, said arms including outwardly bowed crimps intermediate their ends forming locking lugs, each of the arms being formed with a longitudinal series of sharply tipped clamping teeth extending between the crimp of the arm and said loop, the teeth of the respective arms being extended laterally inwardly from the arms in the space therebetween for engaging in opposite sides of the head of a bait fish, said loop being tensioned to normally shift the arms laterally outwardly from each other out of engagement with the bait fish, the arms at their other ends being formed with hook portions; a line connector attached to and projecting forwardly from said loop; and a hood member having a continuous, substantially uniform taper from end to end thereof closely duplicating the taper of a head of a bait fish for snug fitting of the head into the hood member, said member having at its smaller end an opening loosely receiving the line connector, and having adjacent its larger end apertures angularly spaced about the circumference of the hood member for receiving the lugs to releasably lock the member and arms against relative longitudinal movement, said member, when the lugs are engaged in the apertures, holding the arms in head-clamping positions against the restraint of the loop, said member being formed wholly of a transparent material so as to provide for full visibility of said head of the bait fish.

References Cited in the file of this patent

UNITED STATES PATENTS

| 1,515,849 | Eppinger | Nov. 18, 1924 |

FOREIGN PATENTS

| 63,051 | Denmark | Dec. 27, 1944 |
| 490,356 | Canada | Feb. 10, 1953 |